Dec. 3, 1946. T. D. CAMPBELL 2,412,122
ENDLESS TRACK FOR VEHICLES
Filed March 15, 1945

Inventor
Thomas D. Campbell,
By Mason & Hatfield
Attorneys

Patented Dec. 3, 1946

2,412,122

UNITED STATES PATENT OFFICE 2,412,122

ENDLESS TRACK FOR VEHICLES

Thomas D. Campbell, Hardin, Mont.

Application March 15, 1945, Serial No. 582,930

10 Claims. (Cl. 305—10)

This invention relates to a new and improved type of vehicle track in the form of a continuous V-belt or belts including a positive drive by sprockets and pins when needed. A coil spring on the idle sprocket or other suitable means will provide the proper tension for the friction drive of the belt.

Such a track, non-stretchable, with solidly attached driving lugs will maintain constant pitch and eliminate the damage and breakages caused by worn links which lose their pitch and climb the sprockets.

A primary object of the invention is to provide an endless track drive including a positive drive by a sprocket drive mechanism, and a side wall drive.

Another object of paramount importance is to provide an endless track drive provided with means for preventing the endless track from overrunning the sprocket wheel, i. e., riding over one of the sides of the wheel drive.

A further object of the invention is to provide a dual drive which employs a belt as the principal element of the endless track, said belt having side driving walls and being a V-type belt.

Still another object of the invention is to provide an endless track drive for caterpillar type vehicles such as tanks, as well as for other types of vehicles such as a six by six truck.

Other objects will appear hereinafter throughout the specification and will be apparent from a consideration of the following description of certain embodiments of the invention, as shown in the accompanying drawing, in which.

Figure 1:
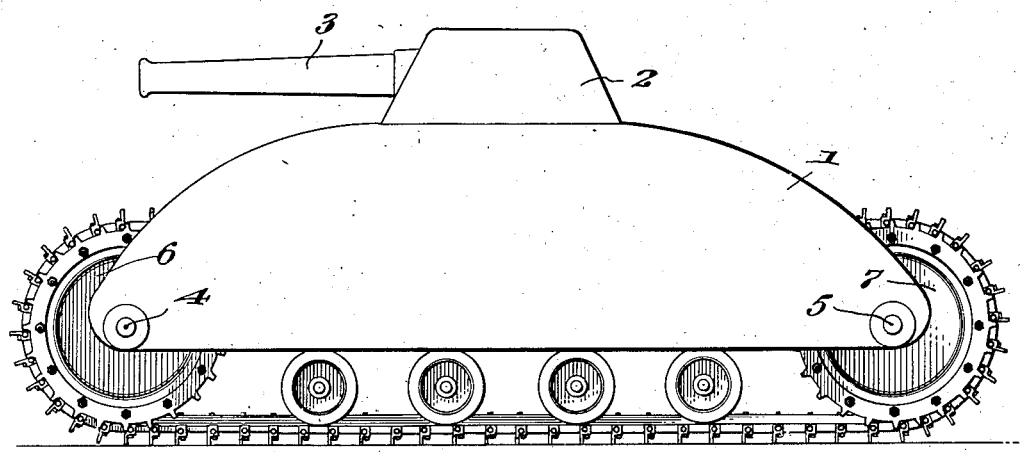
Figure 1 is a somewhat diagrammatic side elevation of a vehicle of the type with which the present invention may be used.

The load is taken by the lugs only when conditions cause the V-belt to slip. It is the intention that the track will be a properly designed V-belt reinforced with wire or other flexible cables, with sufficient side wall friction to transmit driving power except under very unusual conditions.

The lugs and sprockets will then transmit the power to the ground through the belt and no injury will be done to the V-belt by slippage.

These driving lugs can be part of the cleat or they can be driving pins which are forced into the rubber or other material tread attached to the V-belt.

Heretofore, and especially after being used for a considerable time, endless tracks have a tendency to become loose and to ride over the sides of the drive sprockets. In the present invention this is adequately taken care of by the provision of a plurality of driving lugs. The load is taken by the lugs for only about ten per cent of the time during which the endless track will make a complete revolution of the track, i. e., when the track travels from one point back to that point. These lugs are combined with a V-type side wall drive. Practically all of the driving is transmitted through the side walls of the V-track, and not much of the driving torque is carried by the lugs. The principal function of these lugs is to prevent slipping of the track.

The numeral 1 diagrammatically indicates a vehicle, such as a tank, having a turret 2 and a gun 3. Also diagrammatically illustrated are two axles 4 and 5 located respectively at the forward and rear ends of the vehicle. Mounted on these axles 4 and 5 are sprocket drives including drive wheels 6 and 7, respectively.

Figure 2:
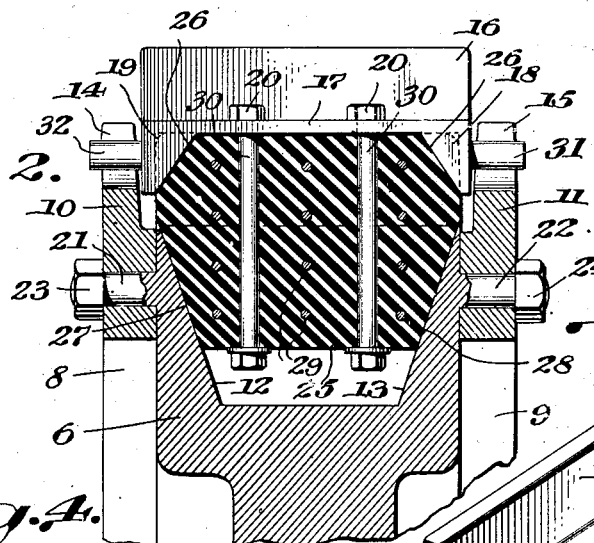
Figure 2 is a vertical section of one of the drive sprockets, partly broken away, and the endless track.

These wheels are preferably identical and the description of the sprocket 6 in Figure 2 will explain the construction of each.

As shown in Figure 2, 8 and 9 are ring-like members which are provided with peripheral portions 10 and 11, which portions are further provided with driving teeth 14 and 15, respectively. The ring-like members are rigidly mounted on the drive wheel 6 by means of a series of spaced threaded studs 21 and 22 which are adapted to mount ends 23 and 24, respectively. The ring-like members 8 and 9 are provided with a series of apertures corresponding to the studs 21 and 22 in order that these members 8 and 9 may be rigidly, but detachably mounted on said drive wheels. As so assembled each constitutes a sprocket drive.

The periphery of each drive wheel 6 and 7 is notched to provide inclined side driving walls 12 and 13.

The endless track member 25 may be suitably constructed of rubber or similar material. In the illustrated embodiment the endless track member is provided with side driven walls 27 and 28 which are driven by the side walls 12 and 13, respectively, of the wheel 6.

Mounted upon the periphery of the endless track member are a plurality of cleats 16, which cleats are provided with substantially horizontal portions 17. Mounted on the side faces of each cleat are lugs 31 and 32 which are adapted to be engaged by the driving teeth 15 and 14, respectively, as shown in Figure 2.

The upper corners of the endless track member are provided with notches 26. The lugs are provided with webs 18 and 19 which form a driving fit with the notches 26 and into which they extend.

Each cleat is mounted on the endless track member by means of headed bolts 20 having shanks 30 extending from the endless track and nuts on the opposite end as shown in Figure 2.

Extending longitudinally of the endless track member are a series of reinforcing members 29. These members may be constructed of drawn wire.

Figure 3:
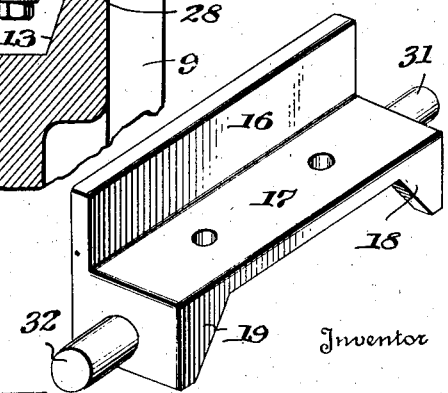
Figure 3 is a perspective view of one form of cleat having driving lugs thereon.
Figure 4:
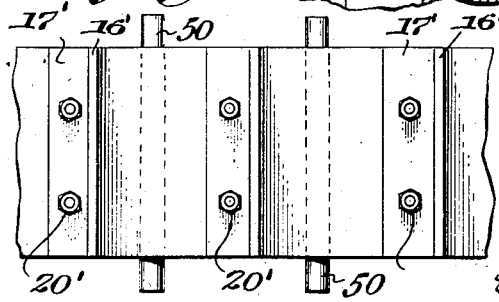
Figure 4 is a view of an alternate form of endless track showing the cleats and lugs forming separate parts thereof.

In the form shown in Figure 4 the endless track member is provided with cleats 16' and as will be noted from an inspection of this figure these cleats are not provided with the lugs 31 and 32 such as shown in Figures 2 and 3. Each cleat has a substantially horizontal portion 17'. Each cleat is held to the endless track member by means of headed bolts 20'. It is to be understood that the endless track shown in Figure 4 is provided with side driving walls similar to the side driving walls 27 and 28 of the endless track member shown in Figure 2. The side walls of this endless track member are provided with spaced apertures, preferably midway between each pair of cleats 16' to provide a driving fit for the lugs 50. Each lug 50 is mounted in substantially the same position with regard to the endless track member as the lugs 31 and 32 shown in Figure 2. In other words the apertures in the endless drive member shown in dotted lines in Figure 4 are located in the upper portion of the endless drive member, i. e., both the side driving walls thereof. Any suitable means, not shown, may be used to retain the lugs 50 in the position shown in Figure 4, should the driving fit of these lugs be insufficient to prevent them from working out of the endless track member.

It will be understood that the present invention may be applied to any vehicle which employs an endless track including tanks, caterpillar tractors, trucks, aircraft, and in fact all types of vehicles.

It will be understood that I may use, without departing from the spirit of this invention, any number of endless track members, it being only necessary to provide each of the sprocket drive wheels with a corresponding number of notches, each having inclined side walls similar to the side walls 12 and 13.

The V-drive portion of the endless track member may have attached to it the so-called tread portion by means of vulcanizing. The line of separation between these two portions has been indicated in Figure 2 by a dotted line.

With the present invention all tendency of the endless track member to ride over either side 10 or 11 of the drive is obviated by the provision of the lugs which prevent the accumulation of slack at each end of the drive, i. e., while the endless track member is passing over the drive wheels 6 and 7.

It is to be understood that the invention is not limited to the specific details of construction shown in the accompanying drawing and described above, but that it covers all modifications coming within the scope of the appended claims and their equivalents.

In the claims:

1. An endless track for vehicles having in combination, wheels at the forward and rear ends thereof, at least one of said wheels having side driving faces, sprocket teeth on said wheel, an endless drive member composed of flexible material having side driving faces adapted to be engaged by the said driving faces of said wheel, said endless drive member having lugs adapted to be engaged by said sprocket teeth, said wheel side driving faces and said endless drive member side driving faces being substantially the sole driving means for said endless drive member, said endless member side driving faces being constructed and adapted to simultaneously engage the side driving faces of at least one of said wheels, said lugs assisting said side driving faces of said wheel and endless member when slippage of said endless drive member occurs and said driving faces of said drive member being composed of flexible material, said side driving faces of said endless member being continuous with said endless track.

2. An endless track for vehicles having in combination, wheels at the forward and rear ends thereof, at least one of said wheels having side driving faces, sprocket teeth on said wheel, an endless drive member composed of flexible material having side driving faces adapted to be engaged by said driving faces of said wheel, said endless drive member having lugs adapted to be engaged by said sprocket teeth, said endless drive member having a plurality of cleats mounted on the periphery thereof, said wheel side driving faces and said endless drive member side driving faces being substantially the sole driving means for said endless drive member, said endless member side driving faces being constructed and adapted to simultaneously engage the side driving faces of at least one of said wheels, said lugs assisting said side driving faces of said wheel and endless member when slippage of said endless drive member occurs and said driving faces of said drive member being composed of flexible material, said side driving faces of said endless member being continuous with said endless track.

3. An endless track for vehicles having in combination, wheels at the forward and rear ends thereof, at least one of said wheels having side driving faces, sprocket teeth on said wheel, an endless drive member composed of flexible material having side driving faces adapted to be engaged by said driving faces of said wheel, said endless drive member having lugs adapted to be engaged by said sprocket teeth, said endless drive member having a plurality of cleats mounted on the periphery thereof, said lugs being integral with said cleats, said wheel side driving faces and said endless drive member side driving faces being substantially the sole driving means for said endless drive member, said endless member side driving faces being constructed and adapted to simultaneously engage the side driving faces of at least one of said wheels, said lugs assisting said side driving faces of said wheel and endless member when slippage of said endless drive member occurs and said side driving faces of said drive member being composed of flexible material, said side driving faces of said endless member being continuous with said endless track.

4. An endless track for vehicles having in combination, wheels at the forward and rear ends thereof, at least one of said wheels having side driving faces, sprocket teeth on said wheel, an endless drive member composed of flexible material having side driving faces adapted to be engaged by said driving faces of said wheel, said endless drive member having lugs adapted to be engaged by said sprocket teeth, said endless drive member having a plurality of cleats mounted on the periphery thereof, said lugs being integral with said cleats and extending from the sides thereof, said wheel side driving faces and said endless drive member side driving faces being substantially the sole driving means for said endless drive member, said endless member side driving faces being constructed and adapted to simultaneously engage the side driving faces of at least one of said wheels, said lugs assisting said side driving faces of said wheel and endless member when slippage of said endless drive member occurs and said driving faces of said drive member being composed of flexible material, said side driving faces of said endless member being continuous with said endless track.

5. An endless track for vehicles having in combination, drive wheels at the forward and rear ends thereof, said drive wheels having inclined driving faces, a plurality of sets of sprocket teeth on each of said wheels between which is located said inclined side driving walls, an endless track member composed of flexible rubber or similar material, said member having inclined faces thereon adapted to be engaged by the walls of each of said wheels, a plurality of cleats, means mounting said cleats on said endless track member, lugs on said cleats extending from the sides of said cleats and adapted to be engaged by the sets of sprocket teeth, said wheel inclined driving walls and said endless drive member including driving faces being substantially the sole driving means for said endless drive member, said inclined faces being constructed and adapted to simultaneously engage the side driving walls of said drive wheels, said lugs assisting said side driving walls when slippage of said endless track member occurs, and said inclined faces of said drive member being composed of rubber or similar material, said inclined faces of said endless member being continuous with said endless track.

6. An endless track for vehicles having in combination, drive wheels at the forward and rear ends thereof, said drive wheels having inclined driving faces, a plurality of sets of sprocket teeth on each of said wheels between which is located said inclined side driving walls, an endless track member composed of flexible rubber or similar material, said member having inclined faces thereon adapted to be engaged by the walls of each of said wheels, a plurality of cleats, means mounting said cleats on said endless track member, lugs on said cleats extending from the sides of said cleats and adapted to be engaged by the sets of sprocket teeth, said means for mounting said cleats comprising a series of flanges and fastening means extending through said flanges and said endless track member, said wheel inclined driving walls and said endless drive member including driving faces being substantially the sole driving means for said endless drive member, said inclined faces being constructed and adapted to simultaneously engage the side driving walls of said drive wheels, said lugs assisting said side driving walls when slippage of said endless track member occurs, and said inclined faces of said drive member being composed of rubber or similar material, said inclined faces of said endless member being continuous with said endless track.

7. An endless track for vehicles having in combination, drive wheels at the forward and rear ends thereof, said drive wheels having inclined driving faces, a plurality of sets of sprocket teeth on each of said wheels between which is located said inclined side driving walls, an endless track member composed of flexible rubber or similar material, said member having inclined faces thereon adapted to be engaged by the walls of each of said wheels, a plurality of cleats, means mounting said cleats on said endless track member, lugs on said cleats extending from the sides of said cleats and adapted to be engaged by the sets of sprocket teeth, said track member being provided with a series of notches and said cleats each having webs which fit into said notches, said wheel inclined driving walls and said endless drive member including driving faces being substantially the sole driving means for said endless drive member, said inclined faces being constructed and adapted to simultaneously engage the side driving walls of said drive wheels, said lugs assisting said side driving walls when slippage of said endless track member occurs, and said inclined faces of said drive member being composed of rubber or similar material, said inclined faces of said endless member being continuous with said endless track.

8. An endless track for vehicles having in combination, drive wheels at the forward and rear ends thereof, said drive wheels having inclined driving faces, a plurality of sets of sprocket teeth on each of said wheels between which is located said inclined side driving walls, an endless track member composed of flexible rubber or similar material, said member having inclined faces thereon adapted to be engaged by the walls of each of said wheels, a plurality of cleats, means mounting said cleats on said endless track member, lugs on said cleats extending from the sides of said cleats and adapted to be engaged by the sets of sprocket teeth, said endless track member having oppositely spaced pairs of notches, and each cleat having a pair of oppositely spaced webs adapted to fit within each pair of spaced notches, said wheel inclined driving walls and said endless drive member including driving faces being substantially the sole driving means for said endless drive member, said inclined faces being constructed and adapted to simultaneously engage the side driving walls of said drive wheels, said lugs assisting said side driving walls when slippage of said endless track member occurs, and said inclined faces of said drive member being composed of rubber or similar material, said inclined faces of said endless member being continuous with said endless track.

9. An endless track for vehicles having in combination, drive wheels therefor, each of said drive wheels having side driving faces, sprocket teeth on said wheels on opposite sides of said faces, an endless track member having continuous and uninterrupted rubber or rubber like side driving faces adapted to be engaged by said driving faces of said walls, said endless driving member having lugs in position to be engaged by said sprocket teeth, the said driving faces of said drive wheels being widely spaced from each other and being at their widest spacing substantially the same width as the side driving faces of said endless driving member, the said side driving faces of said member being constructed and adapted to simultaneously engage the side driving surfaces of each drive wheel, said lugs assisting said driving faces when slippage of said endless driving member occurs, the said side driving faces of said endless member being continuous with said endless track.

10. An endless track for vehicles having in combination, drive wheels therefor, each of said drive wheels having side driving faces, sprocket teeth on said wheels on opposite sides of said faces, an endless track member having continuous and uninterrupted rubber or rubber like side driving faces adapted to be engaged by said driving faces of said walls, said endless driving member having lugs in position to be engaged by said sprocket teeth, a series of spaced cleats mounted on said endless drive member, the said driving faces of said drive wheels being widely spaced from each other and being at their widest spacing substantially the same width as the side driving faces of said endless driving member, the said side driving faces of said member being constructed and adapted to simultaneously engage the side driving surfaces of each drive wheel, said lugs assisting said driving faces when slippage of said endless driving member occurs, the said side driving faces of said endless member being continuous with said endless track.

THOMAS D. CAMPBELL.